United States Patent [19]

Haas

[11] Patent Number: 4,970,717
[45] Date of Patent: Nov. 13, 1990

[54] PHOTONIC LOCAL/METROPOLITAN AREA NETWORK

[75] Inventor: Zygmunt Haas, Matawan, N.J.

[73] Assignee: AT&T Bell Laboratories, Murray Hill, N.J.

[21] Appl. No.: 314,724

[22] Filed: Feb. 23, 1989

[51] Int. Cl.$^5$ .......................... H04J 3/26; H04J 14/08
[52] U.S. Cl. ..................................... 370/60; 370/94.1; 370/4; 370/15
[58] Field of Search ................... 370/13, 15, 16, 16.1, 370/60, 4, 85.5, 94.3, 1, 94.1

[56] References Cited

U.S. PATENT DOCUMENTS

| | | | |
|---|---|---|---|
| 4,674,085 | 6/1987 | Aranguran et al. | 370/94.3 |
| 4,797,589 | 1/1989 | Collins | 370/4 |
| 4,829,512 | 5/1989 | Nakai et al. | 370/16 |
| 4,835,763 | 5/1989 | Lau | 370/16 |
| 4,847,837 | 7/1989 | Morales et al. | 370/16 |

Primary Examiner—Douglas W. Olms
Assistant Examiner—Min Jung
Attorney, Agent, or Firm—Eli Weiss

[57] ABSTRACT

With this invention, collisions of optical packets in local area networks are avoided. Briefly, each branch of a local area network topology, such as a star, a ring or a bus is provided with an optical path having two substantially parallel optical fibers which can be selectively configured to form either a direct straight through path or a loop-back path. Prior to advancing a packet to the next occurring branch, a test is made to determine if it is occupied. If it is not occupied, the packet is advanced along one of the opitcal fibers of the optical path. If it is occupied, then the two optical fibers are rapidly configured to form a loop-back path and the packet travels around the loop-back path, again and again as required until the danger of a collison with a preceding packet no longer exists.

7 Claims, 4 Drawing Sheets

STAR

PHOTONIC LOCAL/METROPOLITAN AREA NETWORK

FIELD OF THE INVENTION

This invention relates generally to packet-switched optical communication systems for use in local and/or metropolitan area networks (LAN's or MAN's) and, more particularly, to such networks which are adapted to resolve collisions between advancing packets without buffering the colliding packets within the switching nodes.

BACKGROUND OF THE INVENTION

Packet-switching technology has been advantageously applied to optical communication systems. In packet-switched networks operating at low transmission speeds, the collisions between advancing packets are resolved by buffering the colliding packets until the output link becomes available. Such a scheme is commonly referred to as store-and-forward routing. Since large optical memories are expensive, today's solution for networks that use optical communication is to convert the optical signal to an electrical signal for appropriate buffering and queuing.

While the buffering and queuing techniques have met with some success for optical communication systems, such techniques become commercially impractical when data transmission speeds increase into the Gbps range. This is because of the optical-to-electrical conversion required. Some alternatives to the store-and-forward scheme have been proposed. One such alternative, commonly referred to as "hot-potato" routing, assumes no buffers in the switching nodes. Whenever two or more packets are about to collide, one packet is forwarded to the desired output and other packet or packets are forwarded to another output, which may not be the best route to the packet destination node.

In general, the switching node of "hot-potato" topologies must have the same number of input and output links. Some examples of networks that utilize the "hot potato" scheme are The Manhattan Street Network (MSN) and Blazenet. Unfortunately, a Manhattan Street Network requires a very inflexible grid type of topology, and Blazenet is designed for wide-area network span.

The proposed invention also uses the "hot potato" routing. However, as opposed to MSN, for example, the proposed invention can be built on totally uncontained topologies. Moreover, because each path contains a reverse channel, the number of input and output paths to a switching node need not, necessarily, be equal.

A "hot-potato" switching scheme by the "loop-back" technique, as used in this invention is described in "Blazenet": "A Photonic Implementable Wide-Area Network," Department of Computer Science, Stanford University, Technical report No. STAN-CS-87-1185, Oct. 1987. The proposed invention deals with the local/metropolitan area networks, as opposed to wide-area networks in "Blazenet" the difference being the number of packets that are stored in the loop-back path and, consequently, the switching algorithm used by the switching nodes.

SUMMARY OF THE INVENTION

This invention refers to a packet-switched local or metropolitan area optical communications network in which collisions between two or more packets are resolved without local buffering in the switching node.

In this invention, a (logical) uni-directional link within a network is replaced by two optical links. One optical link, which is referred to as the forward link, is capable of transmitting an optical signal in the direction of the original optical uni-directional link. The other link, which can be referred to as the reverse link, is capable of transmitting an optical signal in the opposite direction. These links can be selectively configured to form either a direct path between the nodes (in which case only the forward link is used), or a "loop-back" path between the nodes (in which case both the forward and reverse are used to form a closed optical loop between the two nodes). When in the "loop-back" configuration, the path is designed to store a single packet.

Prior to advancing a packet through a node to the next occurring node in the inventive system, a determination is made as to whether or not the optical loop which connects this node to that next node is occupied with a packet. If the optical loop is not occupied, the packet is advanced along the forward optical link to the next node. If the optical fiber loop is occupied, then the reverse optical link connected to the previous node is rapidly reconfigured to form a "loop-back" path, and the packet is sent back to the previous node via this "loop-back" path. The packet may be "recirculated" in this "loop-back" path until the optical loop to the next node becomes available.

BRIEF DECRIPTION OF THE DRAWING

DETAILED DESCRIPTION

The invention introduces a novel local and metropolitan network architecture that is based on switching nodes which do not have local memory. The inventive network involves the use of optical fiber media to store packets in transit when a collision between two or more packets at a switching node is imminent. According to the invention, each uni-directional link in a conventional network is replaced by a fiber path composed of two links that carry packets in opposite directions. These two opposite-directed links can serve as a forward path or as a "loop-back" path. In the later case, the two opposite-directed links are configured to form a loop that can store a single packet, and on which a blocked packet will circulate until the required output loop at the arriving switching node becomes available. This invention avoids the need of buffers within a switching node that needs to operate at high speeds. This becomes a serious problem as the transmission speeds of the optical media increases.

The invention is directed toward high performance communication systems, for example, distributed processing systems. Such high performance communication systems require the "low delay", "multi-point", "on-demand" delivery of large amounts of data.

The "low-delay" characteristic of high performance communication systems refers to the rapidity with which data can be transmitted from one user of the system to another. For example, certain operations—called atomic operations—must be performed without interruption if the integrity of the procedure is to be maintained. Exemplary of such operations is the withdrawal of funds from an account and the immediate debiting of said account to reflect such withdrawal. Clearly, any interruption between such withdrawal and such debiting can endanger the integrity of the associated data bases. Low delay networks minimize the occurrence of such deleterious delays. The term "local area network" and "metropolitan" refer to a general-purpose network that can serve a wide variety of devices. These networks support minicomputers, mainframes, terminals, and other peripheral devices. In many cases, local area networks can carry not only data, but voice, video and graphics.

One of the possible types of a local and metropolitan area network topology which used optical fiber is the star type of topology.

Figure 1:
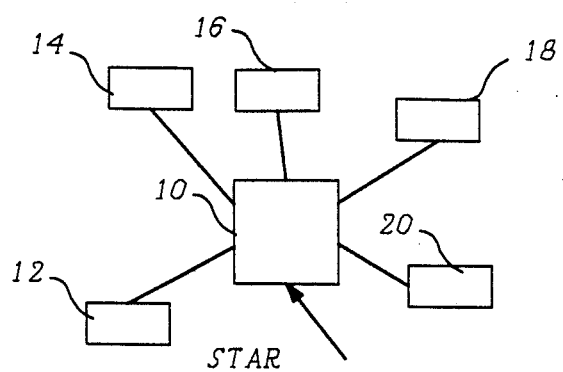
FIG. 1 is a schematic representation of a prior art local area network having a star topology.

Referring to FIG. 1, there is illustrated a Star network. A central switching element 10 is coupled to all of the nodes 12, 14, 16, 18, 20 of the network via, for example, optical fibers. A station wishing to transmit data sends its transmission to the central switching node 10 which forwards the transmission to the specified nodes by addressing data provided to node 10 by the source node.

Figure 2:
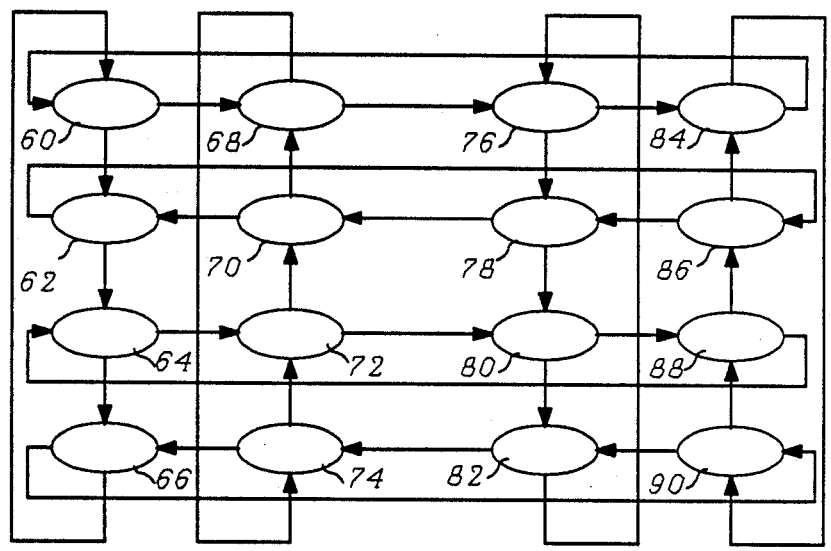
FIG. 2 is a schematic representation of a prior art local area network commonly referred to as a Manhattan Street Network.

Clearly, as the number of users for the network increases, the throughput per user decreases, at least linearly. To help avoid this problem, mesh networks were developed. One such network is the Manhattan Street Network illustrated in FIG. 2. The Manhattan Street Network is based on a grid of alternatingly-directed paths of rows and columns normally referred to as streets and avenues. Various nodes 60, 62, 64, 66, 68, 70, 72, 74, 76, 78, 80, 82, 84, 86, 88, 90 exist on the corners of the streets and avenues. Thus, routing from a particular street and avenue to a destination is straightforward. As in a city with this layout, any destination street and avenue destination can be found without asking directions, even when some roads are blocked. In one of its configuration the Manhattan Street Network does not store-and-forward the data at intermediate nodes, and does require that the packets be immediately forwarded.

Figure 3:
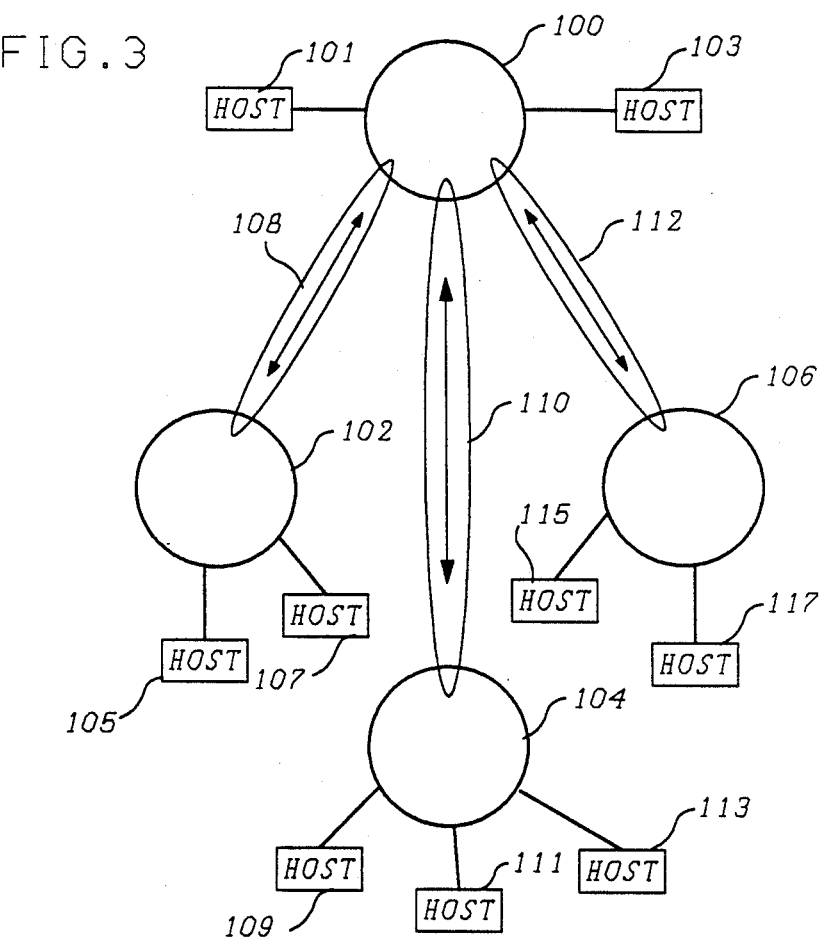
FIG. 3 is a schematic representation of four nodes coupled together via optical fiber paths in accordance with the principles of the invention.

An example of a Star type of network topology, in accordance with the principles of this invention, having four nodes is illustrated in FIG. 3. Switching node 100 is coupled to switching nodes 102, 104, 106 via optical fiber paths 108, 110, 112. Appropriate hosts 101, 103, 105, 107, 109, 111, 113, 115, 117 are associated with each node. Optical fiber paths 108, 110 and 112 can be used to transmit a packet from node 100 directly to nodes 102, 104 and 106 respectively. In the event a destination is occupied, the optical fiber paths can store a single optical packet being transmitted by causing it to circulate around the optical path 108, 110, and/or 112. The number of times a packet circulates can be limited by a loop-count field in the header portion of the packet.

To enable the network of FIG. 3 to carry traffic in two directions, a second optical fiber path is required from node 100 to each of the other nodes 102, 104 and 106. In FIG. 3, double-sided arrows are assigned to the optical fiber paths to indicate that there are two separate paths for serving traffic in opposite directions. Each optical fiber path, or loop 108, 110, 112 is a bi-directional channel which serves unidirectional network traffic. Thus, for bi-directional network traffic, two loops are required. In a different configuration, a single loop can serve traffic in both directions.

Figure 4:
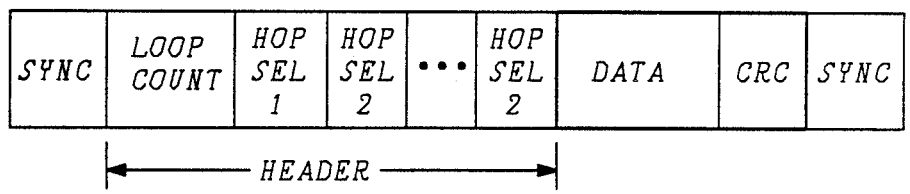
FIG. 4 is a schematic representation of a source routed packet format which can be used to route a packet through a network in accordance with the principles of the invention.

To advance packets, fast switching and simple switching logic at each switching node can be implemented with source routing. Referring to FIG. 4, there is illustrated a format of a packet which can be used to specify the source route as a series of hop-selects. Each hop-select field indicates the output link on which the packet is to be forwarded for that hop. When a packet arrives at a switching node, the first non-zero hop-select field in the packet is examined to determine the next output link for the packet. If that output path is available for transmission of a new packet, the hop-select field is zeroed and the packet is immediately routed to the available output link.

When a packet is blocked because the output path that was selected is unavailable at the packet's arrival time, the packet is routed back to the previous switching node on the return portion of the path that the packet arrived on. At the previous switching node, the return packet is again sent to arrive at the blocking switching node one round-trip time after it first arrives at the node. Thus, the optical fiber path effectively provides short-term storage of one optical packet and causes the packet to reappear at the blocking switching node a short time later. The loopcount field of a packet header is decremented and examined each time a packet is returned. If the loopcount reaches zero, the packet is removed from the network to prevent a packet from indefinitely looping within the network because of a failure or load condition.

This invention does not require memory in the switching node of the size and speed which is required to store all blocked packets, such as would be required for a conventional store-and-forward design. Additionally, the loop-back technique here disclosed exerts back pressure on the link over which the packet was received because each return packet reduces the availability of the path for receiving and forwarding new packets. In an extreme case, the back pressure can extend back from the point of contention to one or more of the packet sources. Besides alerting the packet sources of congestion, the back pressure provides fast feedback to the source routing mechanism to enable it to react more quickly to network load and topological changes.

The simple logic required for hop selection increases its photonic implementation feasibility and makes the switching at gigabit data rate possible.

Each optical fiber path 108, 110, 112 comprises two optical links which, when joined end to end forms a loop and together has a total length which can support a single packet being transmitted, or to the maximum packet size if variable length packets are used. Switches that are used to reconfigure the optical paths are commercial products of, for example, BT&D Technologies, having offices in the United States and in England, and Crystal Technology, Inc., having offices in Palo Alto, California.

If the distance between nodes exceeds the length which corresponds to the packet size, two or more loops can be physically concatenated by a simple switching node with two input and two output loops. If the internodel distance is less than the size of the loop, the excessive length of the loop can be compactly stored. For example, an optical fiber loop located between nodes 100 meters apart can store a packet of about 300 bits when the link operates at 1 Gbps with a single color transmission.

Figure 5:
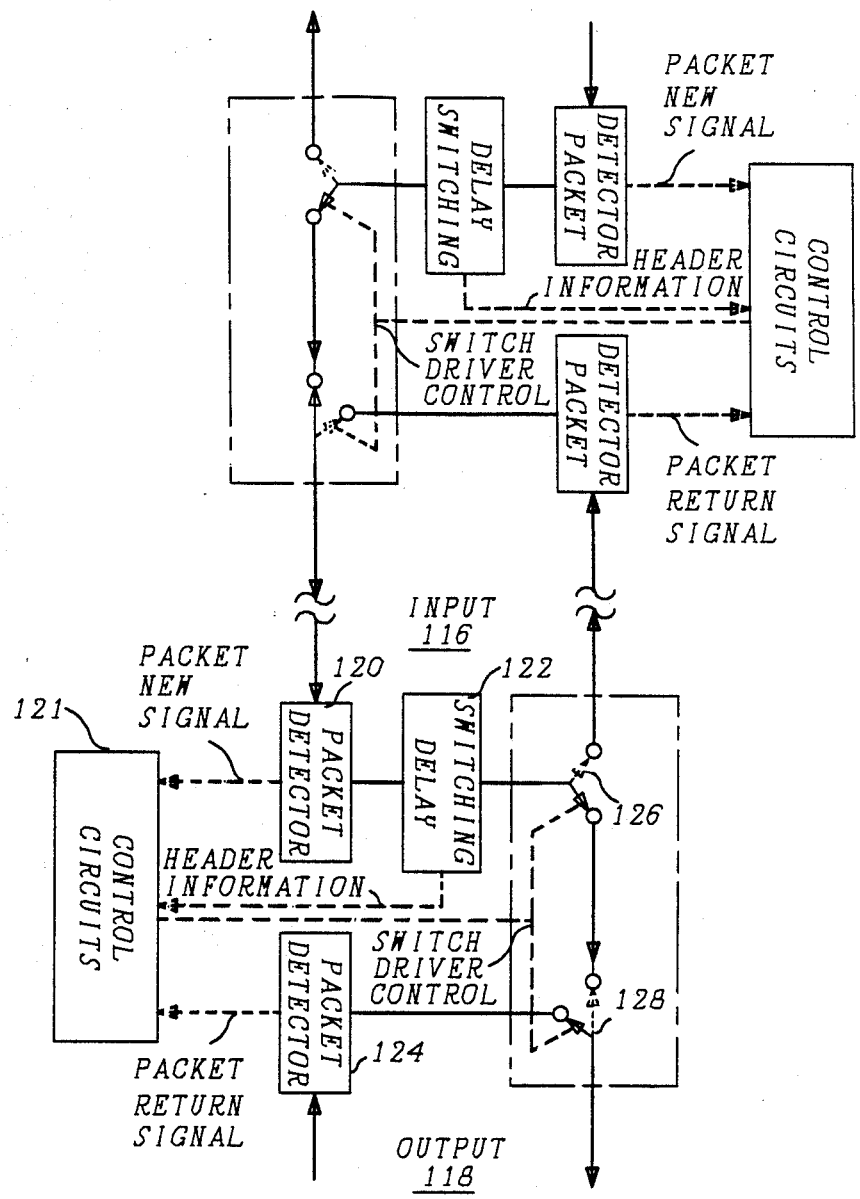
FIG. 5 is a schematic representation of an optical network in accordance with the principles of the invention.

Referring to FIG. 5, there is illustrated a schematic of structure in accordance with the principles of the invention. For simplicity, only two switching nodes each having one input path 116 and one output path 118 are shown. As noted previously, each optical path is comprised of two optical links which can be selectively configured to form a straight-through transmission path for an optical packet or a loop-back path for the optical packet to controllably selectively delay its advance.

Each input path includes a packet detector circuit 120 and a switching delay 122. The packet detector circuit scans the input path for syncs. Upon detection of a sync, the packet detector generates a new-packet signal and reports a packet arrival to a Control circuit 121. Switching delay 122, which is coupled to report header information to Control circuits 121, can comprise a length of fiber which is long enough to contain the packet header and the number of bits which correspond to the time the control logic requires to do the actual switching.

Each output path 118 includes a packet detector circuit 124 that scans the output path for a returned packet and is coupled to report this information to Control circuits 121. Upon detection of a returned packet, a returned-packet signal is generated. A loop is considered to be free if it does not contain a packet or any part of a packet. The Control circuit can uniquely determine the status of a loop using the returned-packet signal and a timer that can be set for a packet length. Other implementations are also possible.

The switching nodes that switch a packet from an input loop 116 to an output loop 118 can be implemented in a switching matrix configuration. However, in those instances where there are a large number of inputs/outputs, an alternate switch architecture, such as a variation of Banyan network, can be used.

When a packet is to be forwarded from an input loop to an output loop, the availability of the output loop is checked. An output loop is available if no active connection of any other loop to this loop currently exists and the loop is not occupied by a returned packet. The condition that a loop is not occupied by a returned packet can be determined by the timer that is triggered by the sync of every transmitted and/or returned packet. If the output loop is available, the packet is clocked from its input loop onto the output loop by closing switches 126, 128 as illustrated. If, on the other hand, the output loop is busy, the packet is blocked, and it is returned by being clocked out on the same input loop it came in on. This is accomplished by positioning switch 126 as shown by the dotted arrow. If more than one packet attempts to enter a specific output loop, only one packet will succeed. The successful packet will be the one with the higher priority (if the priority field is implemented in the packet structure) or the one that is chosen randomly in the case of equal priorities. Each other packet or packets are clocked out on their loops. The input loop terminates at another node and at this other node the loop is referred to as the output loop. At the other node, a blocked packet sets the timer to indicate that the loop is busy and is clocked out to arrive at the blocking node one round trip later.

The switching node of FIG. 5 can be implemented as an interconnection of a number of photonic components.

Figure 6:
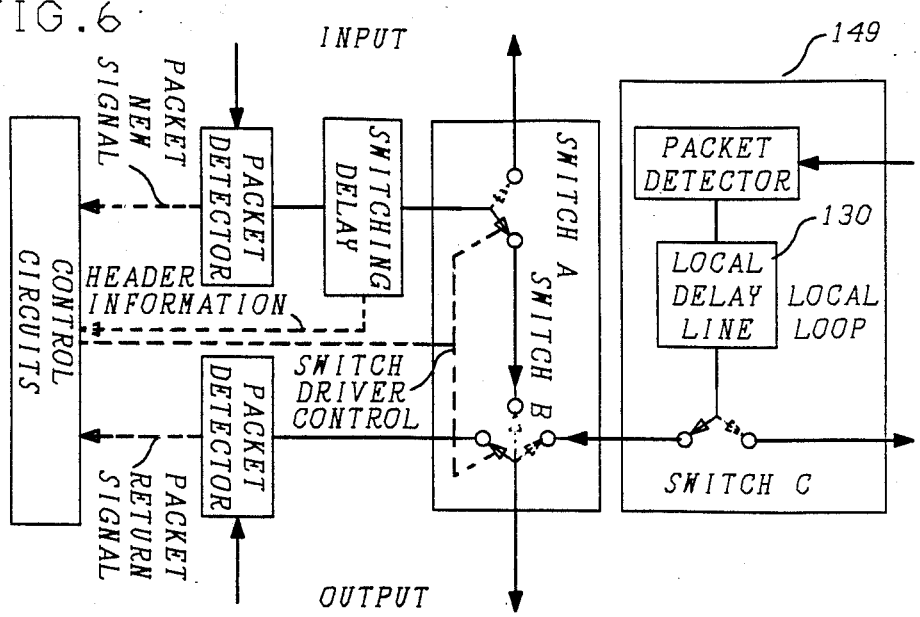
FIG. 6 is a schematic of an additional input for coupling traffic from a local source to the network of FIG. 5.

Referring to FIG. 6, local I/O packets can be handled in a manner similar to the way that the forwarded packets are handled. The local delay line 130 of a local fiber optical loop having two optical links has length that is equal to that of the packet size. When the current packet is inserted into the network, and empties the local loop, a new packet from the local host can be input to the local loop and circulate in the local loop until it is inserted into the network. The schematic of FIG. 6 is similar to that of FIG. 5 with the addition of a local loop and the necessary switches.

In accordance with the principles of this invention, a collision between two packets can be resolved in optical network topologies by replacing each of the various logical links with an optical loop having two substantially parallel optical links with total length that corresponds to the length of a single packet, and which can be selectively configured to form either a direct straight throughput or loop-back path.

Figure 7:
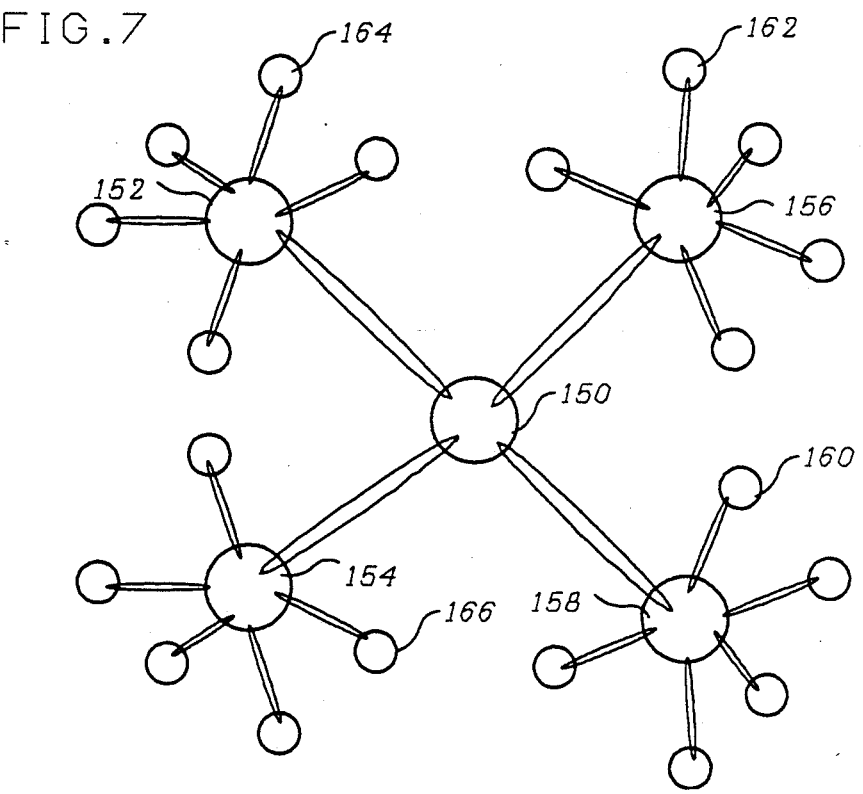
FIG. 7 is a schematic representation of a Star-of-Star network in accordance with the principles of the invention.

FIG. 7 illustrates a Star-of-Star type of network topology having central switching elements 150, 152, 154, 156, 158 interconnected via optical fiber paths, and nodes 160, 162, 164, 166 of each cluster coupled to an associated central switching element via an optical fiber path having two optical links which can be selectively configured to form either a direct straight through path or a loop-back path.

Thus, collisions of optical packets in network topologies are resolved by using selectively configurable optical fiber paths to couple together the various nodes. An optical fiber path, when configured to form a loop-back, resolves collisions by delaying the advance of an optical packet. By recirculating a packet through the loop-back path, the loop-back path effectively functions as a storage medium for the packet. With appropriate switching control, a colliding packet can be recirculated around a loop until a preceding packet has been cleared.

I claim:

1. A local area network for providing communications paths for packets among a plurality of nodes, comprising a first switching node; a second switching node; a first optical fiber path; a second optical fiber path; said first and second optical fiber paths having a combined length which is not less than that of a single packet and not greater than that of two packets; and switch means to controllably selectively couple said first optical fiber path to transmit a packet from said first switching node to said second switching node when said second node is free to accept said packet and to controllably selectively couple said first optical fiber path to said second optical fiber path to return the packet on said first optical fiber path via said second optical fiber paths back toward said first switching node when said second node is not free to accept said packet.

2. The local area network of claim 1 further comprising means coupled to said first switching node to resend a packet back to said second switching node over said first optical fiber path.

3. The local area network of claim 2 further comprising first packet detector means coupled to said first optical fiber path at said second switching node to detect the occurence of a packet, and second packet detector means coupled to said second optical fiber path at said first switching node to detect the occurence of a packet.

4. The local area network of claim 3 wherein said first switching node comprises a first switching means coupled to said second optical fiber path and a second switching means coupled to said first optical fiber path.

5. The local area network of claim 4 further comprising switching delay means coupled to the output of said first packet detector having a delay which is substantially equal to the time required to operate said switching means.

6. The local area network of claim 5 further comprising control circuit means coupled to said first and second packet detectors and said first and second switching means to selectively pass an arriving packet at the second node or to loop-back the arriving packet to said first node over said second optical fiber path.

7. The local area network of claim 6 wherein said switching delay means has a delay equal substantially to the time required for said control circuit means to determine the appropriate action required for an arriving packet plus the time required by said control circuit to operate said switching means plus the time which results from the division of the number of bits in a packet header by the signaling rate of the bits of the packet header.

* * * * *